United States Patent Office 2,854,992
Patented Oct. 7, 1958

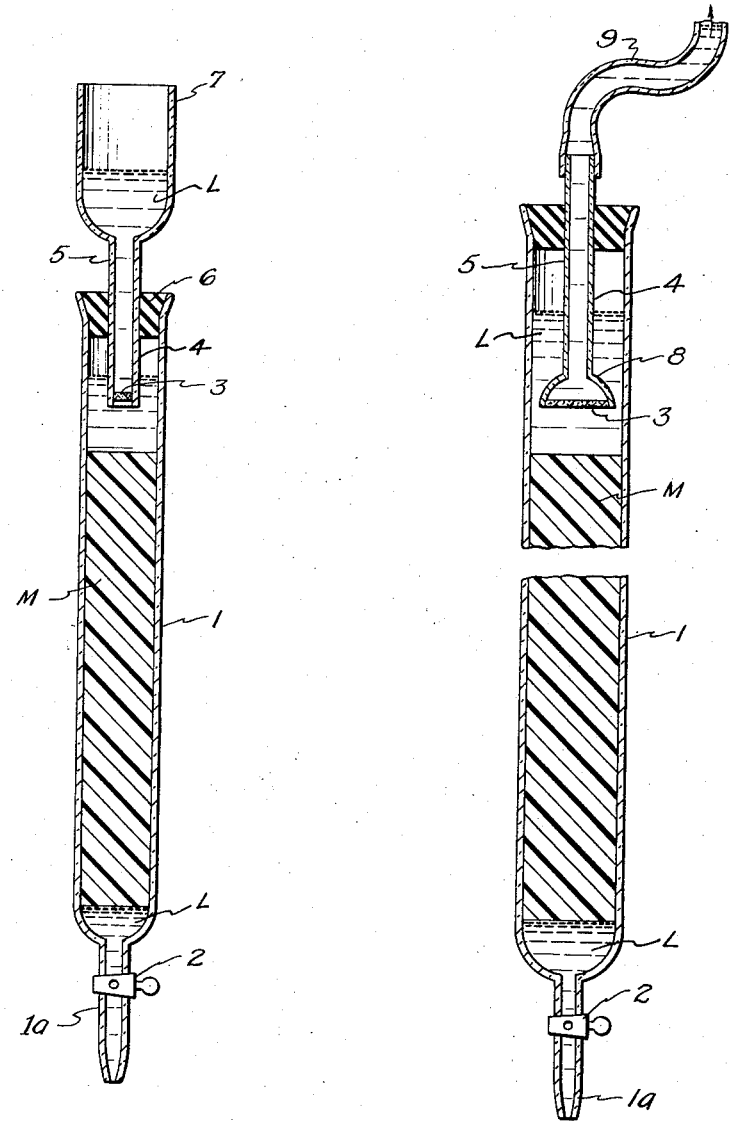

2,854,992

FLOW CONTROL APPARATUS FOR REACTION COLUMNS AND THE LIKE

Clifford A. Hewitt, Falls Church, Va., assignor to the United States of America as represented by the Secretary of Commerce Application April 27, 1956, Serial No. 584,406

3 Claims. (Cl. 137—395)

This invention relates to a flow control apparatus for use in chemical reaction processes and which also has utility as a hydrostatic control device.

In connection with ion exchange or chromatographic columns, for example, wherein a liquid reagent flows through a bed of granular ion exchange material, it is imperative that the bed be maintained submerged in the liquid reagent. If the level of the liquid falls below the top of the bed, the resulting entry of air into the column produces a tendency towards channeling. Similarly, in many reaction processes, as well as in hydraulic system, it is desirable to provide automatic means which will prevent discharge of liquid in a column or chamber when the level of the liquid falls below a predetermined level.

More specifically, the invention relates to a liquid flow control device which acts as an automatic cut-off valve to prevent decrease in a liquid head below a predetermined level.

It is accordingly an immediate object of this invention to provide a flow control device for use in a chemical reaction or ion exchange column or the like which acts to automatically prevent separation between the liquid reagent and the exchange bed.

Another object of this invention is to provide a flow control device for use in an ion exchange column or the like which insures complete submergence of the exchange bed in the liquid reagent regardless of the rate or rate of variation of fluid flow.

It is a further object of this invention to provide a flow control device which automatically maintains a liquid head at a predetermined level in a column or chamber.

Other uses and advantages of the invention will become apparent upon reference to the specification and drawings, in which Fig. 1 illustrates one form of the invention as applied to a chemical reaction system;

Fig. 2 shows a modified arrangement of the control device applied to a conventional ion exchange column.

In accordance with the principles of this invention a diaphragm of finely porous material such as a frit is interposed in the conduit portion of an immersion tube used to supply liquid to a column or chamber at a position corresponding to the liquid level desired to be maintained. When the liquid level in the tube falls to the level of the diaphragm, the level of the liquid in the column is maintained by the surface tension of the film on the frit.

Referring to Figs. 1 and 2, there is shown a reaction apparatus comprising a reaction column or chamber 1 which contains one of the reactants M, such as, for example, a resin bed, when an ion exchange column is contemplated as in Fig. 2. The principles of the invention are not limited to such immediate application since it is obvious that the material M within the column 1 can be any reactant, or any physical structure in which a liquid head is to be maintained.

For purposes of illustration, a control device which may be in the form of a stopcock 2 is provided at the lower reduced end forming the outlet of the column to determine the rate of liquid flow and to prevent ingress of gas or air, as will be described.

A filter-like device of fine porous material in the form of a diaphragm or plug 3 is suitably mounted in the upper end of the column at a position corresponding to the desired liquid level to be maintained. Any suitable porous material may be employed for such purpose. A Pyrex fritted filter disk such as is described on page 162 of "Laboratory Glassware," catalogue LP36 published by Corning Glass Works has been found suitable. As is well known, fritted filter disks may be made of glass, metal, ceramic, or other insoluble material. The disk is suitably perforated to provide pores which generally vary in diameter from 1.0 to 200 microns, the size of the pores selected being commensurate with the flow viscosity of the particular reactant being employed. A disk made of Pyrex glass is particularly efficacious in connection with chemical reactions because of its heat-resistant qualities.

The fritted diaphragm or plug may preferably be mounted in the conduit portion 4 of an immersion tube 5 maintained in the upper inlet portion of the column 1 by a gas-tight stopper 6. In accordance with the embodiment shown in Fig. 1 a reserovir 7 is provided for introducing the liquid reagent into the reaction chamber 1. Alternately, as illustrated in the modifications shown in Fig. 2, the flow control member 3 is in the form of a diaphragm mounted in the flared end portion 8 of the immersion tube 5, which, in turn, is connected to a liquid feed line 9.

In either modification, the immersion tube carrying the control device 3 is positioned within the column at a height corresponding to the desired level of the liquid reagent. For example, in connection with ion exchange columns, it is imperative that the resin bed, or other material M employed, be always completely submerged in the liquid reagent L. The holder is positioned so that the control frit 3 is above the top of the bed by an amount consonant with the liquid head to be maintained.

In operation, opening of the stopcock 2 will cause flow of the liquid reagent from the reservoir 7 or supply source 9 through the material M in the column 1. According to conventional known arrangements, extremely careful control of the flow rate must be maintained to insure submergence of the material M. Alternately, as in the patent to Swenson, No. 2,517,051, relatively expensive automatic control mechanism is required to properly regulate the flow of liquid to insure submergence of the material in the column.

In accordance with the principles of the present invention, the fritted member 3 in the immersion tube functions as an automatic stop valve to stop the flow of liquid through the chamber 1 when the liquid head falls below the position occupied by the frit 3. In operation, the level of the liquid solution above the material M is preferably maintained about half-way between the bottom of the stopper 6 and the fritted disk 3. The flow of liquid through the disk 3 stops when the level of the liquid reaches that of the disk.

The fritted disk or diaphragm 3 prevents the liquid in the column 1 from draining because the surface tension of the liquid solution in the pores of the frit is sufficient to prevent the air from passing through. Thus, a partial vacuum is created above the liquid in the column. When such vacuum pressure equals the hydrostatic head of the liquid above the submerged material M, drainage stops. Moreover, because the fritted disk is immersed in the liquid, it serves to reduce turbulence when the system is in operation.

In connection with analytical work, where a definite volume of liquid reagent is known to strip the column of a required element, the entire predetermined volume of the eluting solution can be added at one time to the reservoir 7 by employing the apparatus shown in Fig. 1. The automatic cut-off control effect of the fritted disk 3 enables the operator to effectively manage a considerable number of reaction systems.

While a preferred embodiment has been disclosed and described, it will be obvious that the invention has utility as a control device of the type described in connection with any hydraulic or liquid system where it is desirable to regulate the liquid head at a predetermined level.

It will thus be apparent that the embodiment shown is only exemplary and that various modifications can be made in construction and arrangement within the scope of the invention as defined in the appended claims.

What is claimed is:

1. In an exchange apparatus or the like employing a fluid-tight chamber having an upper inlet and a lower outlet and in which a liquid head is to be maintained at a pretetermined level, conduit means comprising an immersion tube having a portion immersed in said chamber at a point below the level of said liquid forming a fluid-tight seal in said inlet for introducing the liquid into said chamber at a point below the level of the liquid head in said chamber and means for automatically stopping discharge of the liquid from said chamber through said outlet when the liquid head falls below said predetermined level comprising a diaphragm of finely porous fritted material positioned in said immersed portion of said tube at a point below the level of the liquid head in said chamber, said diaphragm having a porosity such that the surface tension of the liquid in the pores thereof provides a substantially gas-tight seal between the liquid below said diaphragm and the fluid-tight portion of said chamber above said diaphragm.

2. The invention of claim 1 in which the outlet of said chamber is provided with a control means for regulating the rate of discharge of said liquid and for preventing ingress of fluid into said chamber.

3. The invention of claim 1 in which said diaphragm comprises a fritted filter disk made of heat-resistant glass.

References Cited in the file of this patent
UNITED STATES PATENTS

| 179,863 | Moritz | July 18, 1876 |
| 2,693,801 | Foreman | Nov. 9, 1954 |